(12) United States Patent
Lai et al.

(10) Patent No.: US 11,889,056 B2
(45) Date of Patent: **\*Jan. 30, 2024**

(54) METHOD OF ENCODING OR DECODING VIDEO BLOCKS BY CURRENT PICTURE REFERENCING CODING

(71) Applicant: MEDIATEK INC., Hsinchu (TW)

(72) Inventors: Chen-Yen Lai, Hsinchu (TW); Yu-Ling Hsiao, Hsinchu (TW); Tzu-Der Chuang, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 110 days.

This patent is subject to a terminal disclaimer.

(21) Appl. No.: 17/567,313

(22) Filed: Jan. 3, 2022

(65) Prior Publication Data

US 2022/0124319 A1 Apr. 21, 2022

Related U.S. Application Data

(63) Continuation of application No. 17/291,085, filed as application No. PCT/CN2019/115905 on Nov. 6, 2019, now Pat. No. 11,252,406.

(Continued)

(51) Int. Cl.
*H04N 19/105* (2014.01)
*H04N 19/159* (2014.01)
(Continued)

(52) U.S. Cl.
CPC ........ *H04N 19/105* (2014.11); *H04N 19/159* (2014.11); *H04N 19/176* (2014.11); *H04N 19/186* (2014.11); *H04N 19/96* (2014.11)

(58) Field of Classification Search
CPC .. H04N 19/105; H04N 19/186; H04N 19/176; H04N 19/96; H04N 19/159
See application file for complete search history.

(56) References Cited

U.S. PATENT DOCUMENTS

| | | | |
|---|---|---|---|
| 6,332,171 B1 | 12/2001 | Baskey et al. | |
| 8,929,451 B2 | 1/2015 | Fishwick et al. | |

(Continued)

FOREIGN PATENT DOCUMENTS

| | | |
|---|---|---|
| CN | 102917197 A | 2/2013 |
| CN | 103843347 A | 6/2014 |

(Continued)

OTHER PUBLICATIONS

International Search Report and Written Opinion dated Feb. 3, 2020, issued in application No. PCT/CN2019/115905.

(Continued)

*Primary Examiner* — Nam D Pham
(74) *Attorney, Agent, or Firm* — McClure, Qualey & Rodack, LLP (57) ABSTRACT

Video processing methods comprise receiving input data of a current block in a current picture having a plurality of Virtual Pipeline Data Units (VPDUs), wherein each VDPU is a fixed size, performing a decoding process to decode Coding Units (CUs) in the current VPDU and generate decoded samples of the current VPDU, wherein each CU coded in a Current Picture Referencing (CPR) mode is decoded by fetching decoded samples in a reference block stored in a CPR referring buffer, and updating the CPR referring buffer by storing the decoded samples of the current VPDU when finishing the decoding process of the current VPDU, wherein the CPR referring buffer is updated one VPDU by one VPDU.

5 Claims, 8 Drawing Sheets

Related U.S. Application Data (60) Provisional application No. 62/756,612, filed on Nov. 7, 2018.

(51) Int. Cl.
  *H04N 19/176* (2014.01)
  *H04N 19/186* (2014.01)
  *H04N 19/96* (2014.01)

(56) References Cited

U.S. PATENT DOCUMENTS

| | | | |
|---|---|---|---|
| 9,083,983 | B2 | 7/2015 | Coban et al. |
| 10,027,981 | B2 | 7/2018 | Xu et al. |
| 10,212,445 | B2 | 2/2019 | Rapaka et al. |
| 10,469,864 | B2 | 11/2019 | Lee et al. |
| 10,812,822 | B2 | 10/2020 | Rapaka et al. |
| 11,140,411 | B2 | 10/2021 | Liu et al. |
| 11,563,971 | B2 | 1/2023 | Lee et al. |
| 2012/0257678 | A1 | 10/2012 | Zhou et al. |
| 2012/0263231 | A1 | 10/2012 | Zhou |
| 2013/0215975 | A1* | 8/2013 | Samuelsson ........... H04N 19/58 375/240.25 |
| 2016/0073115 | A1 | 3/2016 | Yoon et al. |

FOREIGN PATENT DOCUMENTS

| | | |
|---|---|---|
| CN | 106416243 A | 2/2017 |
| CN | 106797479 A | 5/2017 |
| CN | 107005692 A | 8/2017 |
| CN | 107005696 A | 8/2017 |
| CN | 107079161 A | 8/2017 |
| TW | 201714455 A | 4/2017 |
| WO | 2014/082680 A1 | 6/2014 |
| WO | 2014/163458 A1 | 10/2014 |

OTHER PUBLICATIONS

Chinese language office action dated May 20, 2021, issued in application No. TW 108140225.

Extended European Search Report dated Jul. 21, 2022, issued in application No. EP 19881196.0.

Bross, B., et al.; "Versatile Video Coding (Draft 4);" Joint Video Experts Team (JVET) of ITU-T SG 16 WP 3 and ISO/IEC JTC 1/SC 29/WG 11; Feb. 2019; pp. 1-267.

Bross, B., et al.; "Versatile Video Coding (Draft 3);" Joint Video Experts Team (JVET) of ITU-T SG 16 WP 3 and ISO/IEC JTC 1/SC 29/WG 11; Oct. 2018; pp. 1-233.

Zhang, L., et al.; "CE4: History-based Motion Vector Prediction (Test 4.4.7);" Joint Video Experts Team (JVET) of ITU-T SG 16 WP 3 and ISO/IEC JTC 1/SC 29/WG 11; Oct. 2018; pp. 1-4.

Chen, J., et al.; "Algorithm description for Versatile Video Coding and Test Model 3 (VTM 3);" Joint Video Experts Team (JVET) of ITU-T SG 16 WP 3 and ISO/IEC JTC 1/SC 29/WG 11; Dec. 2018; pp. 1-38.

Hsu, C., et al.; "CE1-related: Constraint for binary and ternary partitions;" Joint Video Experts Team (JVET) of ITU-T SG 16 WP 3 and ISO/IEC JTC 1/SC 29/WG 11; Jul. 2018; pp. 1-4.

Chinese language Notice of Allowance dated Apr. 25, 2023, issued in application No. CN 201980072894.6.

Huang, S., et al.; "Fast intra prediction for HEVC screen content;" Journal of Optoelectronics•Laser; vol. 29; No. 6; Jun. 2018; pp. 604-609.

English language abstract of "Fast intra prediction for HEVC screen content" (p. 1 of publication).

Extended European Search Report dated Jun. 6, 2023, issued in application No. EP 23170555.9.

Xu, X., et al.; "CE8-related: CPR mode with local search range optimization;" Joint Video Experts Team (JVET) of ITU-T SG 16 WP 3 and ISO/IEC JTC 1/SC 29/WG 11; Oct. 2018; pp. 1-6.

Alshina, E., et al.; "AhG5: Intra block copy within one LCU;" Joint Collaborative Team on Video Coding (JCT-VC) of ITU-T SG 16 WP 3 and ISO/IEC JTC 1/SC 29/WG 11; Oct.-Nov. 2013; pp. 1-8.

* cited by examiner

Fig. 1

MxM            M/2xM           MxM/2          M/2xM/2

M/4xM (L)       M/4xM (R)       MxM/4 (U)       MxM/4 (D)

Fig. 3B in SCC, namely intra palette coding (CPC).

a CU (coding unit) will

METHOD OF ENCODING OR DECODING VIDEO BLOCKS BY CURRENT PICTURE REFERENCING CODING

CROSS REFERENCE TO RELATED APPLICATIONS

The present invention is a Continuation of pending U.S. patent application Ser. No. 17/291,085, filed on May 4, 2021, which is a 371 National Phase application of PCT Serial No. PCT/CN2019/115905, filed on Nov. 6, 2019, which claims priority to U.S. Provisional Patent Application, Ser. No. 62/756,612, filed on Nov. 7, 2018, entitled "Methods of Current Picture Referencing Coding with Sub-block Mode". The above U.S. Provisional Patent Application is hereby incorporated by reference in its entirety.

FIELD OF THE INVENTION

The present invention relates to video encoding and decoding by current picture referencing coding. In particular, the present invention relates to implementing current picture referencing coding with one or more coding tools.

BACKGROUND AND RELATED ART

Figure 1:
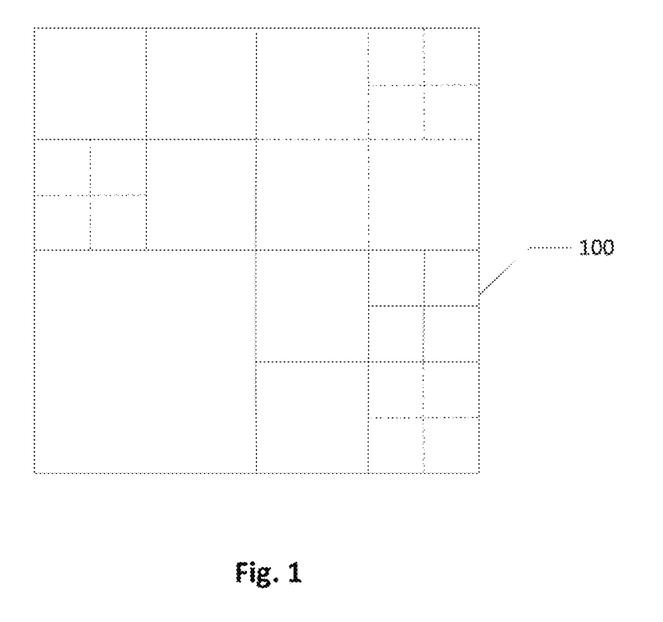
FIG. 1 illustrates an exemplary coding tree for splitting a Coding Tree Unit (CTU) into Coding Units (CUs) and splitting each CU into one or more Transform Units (TUs) according to quadtree splitting defined in the HEVC standard.

The High Efficiency Video Coding (HEVC) standard is the latest video coding standard developed by the Joint Collaborative Team on Video Coding (JCT-VC)) group of video coding experts from ITU-T Study Group. The HEVC standard relies on a block-based coding structure which divides each slice into multiple Coding Tree Units (CTUs). A coded picture is represented by one or a collection of slices, each slice includes an integer number of CTUs. The individual CTUs in a slice are processed according to a raster scanning order. In the HEVC main profile, minimum and maximum sizes of a CTU are specified by syntax elements in the Sequence Parameter Set (SPS) among the sizes of 8×8, 16×16, 32×32, and 64×64. Sample values of each block in a Bi-predictive (B) slice are decoded using intra picture prediction or inter picture prediction using at most two motion vectors and reference indices. Sample values of each block in a Predictive (P) slice is decoded using intra picture prediction or inter picture prediction using only one motion vector and reference index. An Intra (I) slice is decoded using intra picture prediction only. Each CTU is further recursively divided into one or more Coding Units (CUs) according to a quadtree (QT) splitting process to adapt to various local motion and texture characteristics. A CTU size is M×M, where M is one of the values of 64, 32, and 16. Each CTU is either a single CU or split into four smaller units of equal sizes of M/2×M/2, which are referred to as nodes of a coding tree. If a node is not further split, it is a leaf node of the coding tree, and each leaf node is a CU. The quadtree splitting process can be iterated until the size of a node reaches a minimum allowed CU size specified in the SPS. An example of the quadtree block partitioning structure for splitting a CTU into multiple CUs is illustrated in FIG. 1, where solid lines indicate CU boundaries in CTU 100.

Figure 2:
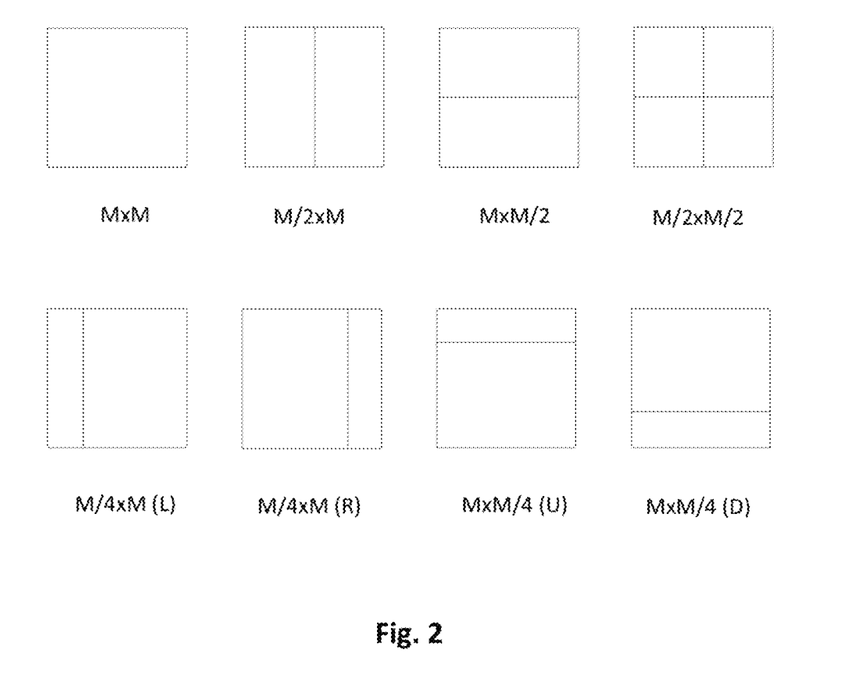
FIG. 2 illustrates eight different Prediction Unit (PU) partition types for splitting a CU into one or more PUs according to the HEVC standard.

The prediction decision is made at the CU level, where each CU is either coded by inter picture (temporal) prediction or intra picture (spatial) prediction. Since the minimum CU size can be 8×8, the minimum granularity for switching different basic prediction type is 8×8. Once the splitting of CU hierarchical tree is done, each CU is subject to further split into one or more Prediction Units (PUs) according to a PU partition type for prediction. FIG. 2 shows eight PU partition types defined in the HEVC standard. Each CU is split into one, two, or four PUs according to one of the eight PU partition types shown in FIG. 2. The PU, together with the associated CU syntax, works as a basic representative block for sharing the prediction information as the same prediction process is applied to all pixels in the PU and prediction relevant information is conveying to the decoder on a PU basis. A specified prediction process is employed to predict the values of associated pixel samples inside the PU. After obtaining a residual signal generated by the prediction process, residual data of the residual signal belong to a CU is split into one or more Transform Units (TUs) according to a Residual QuadTree (RQT) block partitioning structure for transforming the residual data into transform coefficients for compact data representation. Dashed lines in FIG. 1 indicate TU boundaries. A TU is a basic representative block for applying transform and quantization on the residual signal and transform coefficients respectively. For each TU, a transform matrix having the same size as the TU is applied to the residual signal to generate the transform coefficients, and these transform coefficients are quantized and conveyed to the decoder on a TU basis. A transform unit is composed of a Transform Block (TB) of luma samples of size 8×8, 16×16, or 32×32, and two corresponding transform blocks of chroma samples in a picture coded according to a 4:2:0 color sampling format. An integer transform is applied to a transform block and the level values of the quantized coefficients together with the other side information are entropy coded in the video bitstream.

The terms Coding Tree Block (CTB), Coding block (CB), Prediction Block (PB), and Transform Block (TB) are defined to specify two-dimensional sample array of one color component associated with the CTU, CU, PU, and TU respectively. For example, a CTU consists of one luminance (luma) CTB, two chrominance (chroma) CTBs, and its associated syntax elements. In the HEVC system, the same quadtree block partitioning structure is generally applied to both luma and chroma components unless a minimum size for chroma block is reached.

Binary-tree (BT) splitting structure is an alternative structure to the quadtree splitting structure which recursively divides a block into two smaller blocks. The most efficient and simplest binary tree splitting types are symmetric horizontal and symmetric vertical splitting types. For a given block of size M×N, a flag is signaled to indicate whether this block is split into two smaller blocks, if true, another syntax element is signaled to indicate which splitting type is used. In a case when the given block is partitioned by the symmetric horizontal splitting type, the given block is split into two blocks of size M×N/2, otherwise, the given block is split into two blocks of size M/2×N. The binary tree splitting process can be iterated until the size, width, or height of a block reaches a minimum allowed block size, width, or height defined in a high level syntax element. Both the minimum allowed block width and height are specified as there are horizontal and vertical splitting types in the binary tree splitting process. The horizontal splitting type is implicitly prohibited when the splitting results in a block height smaller than the specified minimum height. Similarly, the vertical splitting type is implicitly prohibited when the splitting results in a block width smaller than the specified minimum width. The binary tree structure can be used to partition a block into multiple smaller blocks, for example, it can be used to partition a slice into CTUs, a CTU into CUs, a CU into PUs, or a CU into TUs.

Figure 3A:
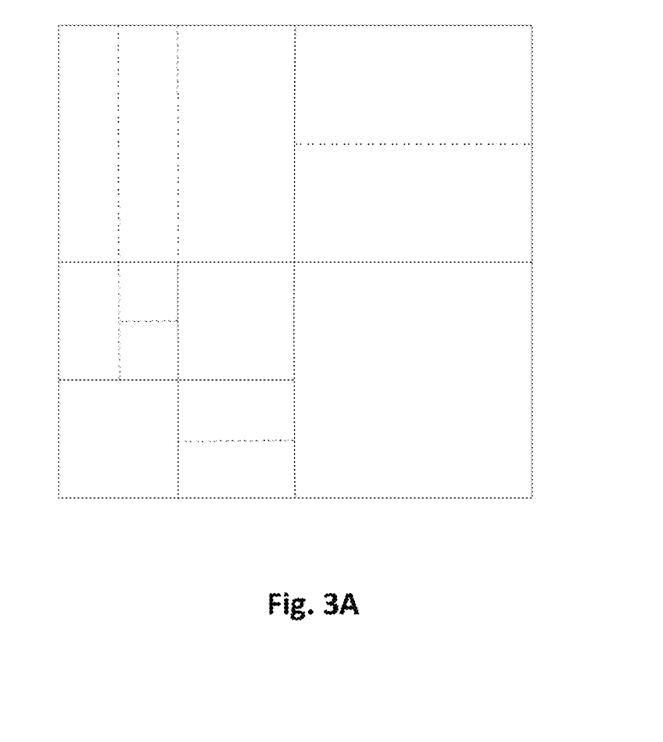
FIG. 3A illustrates an exemplary block partitioning structure according to a QuadTree plus Binary Tree (QTBT) splitting structure.
Figure 3B:
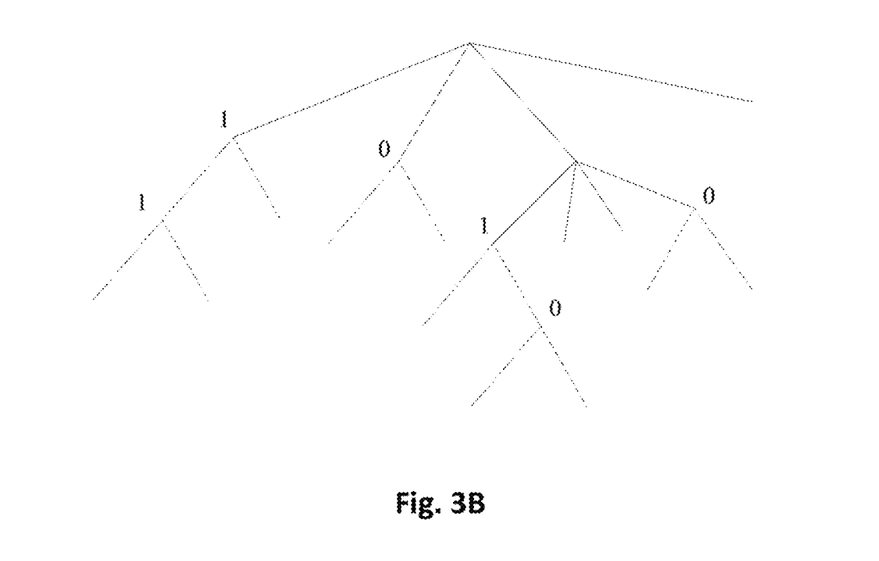
FIG. 3B illustrates a coding tree structure corresponding to the QTBT splitting structure of FIG. 3A.

The binary tree structure is more flexible than the quadtree structure as more partition shapes can be supported, which is also a source of coding efficiency improvement. However, the encoding complexity is also increased as the encoder needs to determine a best partition shape from variety of partition shapes. A new splitting structure called QuadTree plus Binary Tree (QTBT) structure balances the coding efficiency and the coding complexity of the quadtree splitting structure and the binary tree splitting structure. An exemplary QTBT structure is shown in FIG. 3A, where a CTU is firstly partitioned by a quadtree structure then a binary tree splitting structure. The CUs can be recursively partitioned by quadtree splitting until a current CU size reaches a minimum allowed quadtree leaf node size. Each leaf quadtree block may be partitioned by binary tree splitting if the leaf quadtree block size is not larger than a maximum allowed binary tree root node size. The binary-tree splitting may be recursively applied until the current CU size, width, or height reaches a minimum allowed binary tree leaf node size, width, or height or the binary tree depth reaches a maximum allowed binary tree depth. Only horizontal symmetrical splitting and vertical symmetrical splitting are the two allowed binary tree splitting types in QTBT splitting. The resulting leaf CUs from QTBT splitting may be employed for prediction and transform processing without any further partitioning. FIG. 3A illustrates an example of block partitioning structure according to the QTBT splitting structure and FIG. 3B illustrates a corresponding coding tree diagram for the QTBT splitting structure shown in FIG. 3A. Solid lines in FIGS. 3A and 3B indicate quadtree splitting while dashed lines indicate binary tree splitting. In each splitting node (i.e., non-leaf) of the binary-tree structure, one flag indicates which splitting type is used, 0 indicates horizontal symmetrical splitting and 1 indicates vertical symmetrical splitting. For CTUs coded in I-type slices, the QTBT coding tree representation for chroma CTBs may be different from the QTBT coding tree representation for a corresponding luma CTB. For CTUs coded in P-type and B-type slice, the same QTBT coding tree representation is applied to both chroma CTBs and luma CTB except when a certain minimum size is reached for a chroma block. In the QTBT splitting structure, the minimum allowed quadtree leaf node size, the maximum allowed binary tree root node size, the minimum allowed binary tree leaf node width and height, and the maximum allowed binary tree depth and height are indicated in the high level syntax such as in the SPS.

The QTBT splitting structure can be used for partitioning a block into multiple smaller blocks, for example, the QTBT splitting structure is used to partition a CTU into CUs, and the CUs are further processed by prediction and transform coding. In other words, a leaf node of the QTBT splitting structure is a basic unit for both prediction and transform coding. In one example, a size of a CTU is 128×128, a minimum allowed quadtree leaf node size is 16×16, a maximum allowed binary tree root node size is 64×64, minimum allowed binary tree leaf node width and height are both 4, and a maximum allowed binary tree depth is 4. Each CTU is partitioned by a quadtree splitting structure in this example, so a leaf quadtree unit may have a size ranging from 16×16, the minimum allowed quadtree leaf node size, to 128×128, the size of the CTU. If a leaf quadtree unit is 128×128, it cannot be further split by binary tree splitting since the size of the leaf quadtree unit exceeds the maximum allowed binary tree root node size 64×64; otherwise, the leaf quadtree unit with a size less than or equal to 64×64 can be further split by binary tree splitting. When splitting a leaf quadtree unit by binary tree splitting, this leaf quadtree unit is also the root binary tree unit, which has a binary tree depth equal to 0. When the binary tree depth reaches 4, the specified maximum depth, splitting is implicitly prohibited. Similarly, when a width or height of a binary tree node equal to 4, horizontal or vertical splitting is implicitly prohibited, respectively. The leaf nodes of the QTBT splitting structure are further processed by prediction and transform coding.

The QTBT splitting structure is applied separately to luma and chroma components for Intra (I) slices, and applied simultaneously to both luma and chroma components for Predictive (P) and Bi-predictive (B) slices except when certain minimum sizes are reached for the chroma component. In an Intra slice, a luma CTB has its own QTBT-structure block partitioning and two corresponding chroma CTBs share another QTBT-structure block partitioning. Alternatively, the two chroma CTBs have their own QTBT-structure block partitioning.

Figure 4:
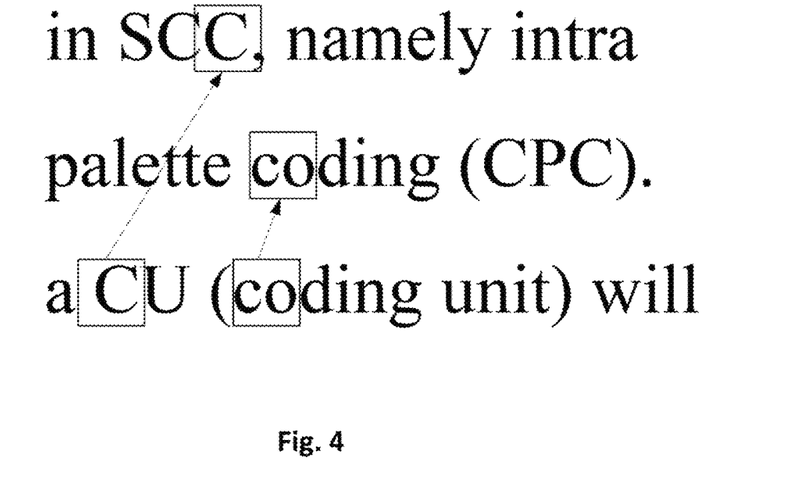
FIG. 4 demonstrates some examples of using the Current Picture Referencing (CPR) technique in coding the screen content.

Inter prediction or motion compensation, including Inter mode, Merge mode, and Skip mode, is designed to exploit temporal correlations between a current picture and one or more reference pictures. A Motion Vector (MV) is used to represent a displacement between a current block in a current picture and a corresponding reference block in a reference picture. It is generally assumed that patterns corresponding to objects or background in a current picture are displaced to form corresponding objects on subsequent pictures or correlated with other patterns within the current picture. With the estimation of such a displacement from other pictures, such as using block matching techniques, the patterns could be mostly reproduced without re-coding the patterns. Similarly, block matching may be performed within the same picture to select a reference block. It is similar to the block matching process in inter prediction, a motion vector is used to represent a displacement between a current block and a corresponding reference block in the current picture. The corresponding reference block is a previously reconstructed block within the same picture as the current block. This technique is called Intra Block Copy (IBC) or Current Picture Referencing (CPR), was observed to be not efficient when applying this technique to camera captured video contents. One of the reasons is that textual patterns in a spatial neighboring area may be similar to a current coding block but usually with some gradual changes over space. It is difficult for a block to find an exact match within the same picture in camera captured video, so the improvement in coding performance is limited. However, CPR is a very effective technique to encode screen contents by searching a similar pattern in the current picture. For a typical video with text and graphics, there are usually repetitive patterns within the same picture. To process a current block in a current picture by the CPR mode, the current block is predicted from a previously reconstructed block within the current picture. A motion vector, also called a Block Vector (BV) is used to signal a relative displacement from the position of the current block to that of a reference block. Prediction errors are then coded using transformation, quantization, and entropy coding. Some examples of CPR compensation used in screen content coding are illustrated in FIG. 4. Reference samples in the reference block derived from the MV correspond to reconstructed samples of the current picture prior to in-loop filter operations, both deblocking and Sample Adaptive Offset (SAO) filters in the HEVC standard.

A first version of CPR compensation was limited to be within a small local area with only 1 dimensional MV and only for blocks with a size of 2N×2N. A more advanced CPR design was later developed. A few bitstream conformance constraints are imposed to regulate a valid CPR MV value of a current PU in the more advance CPR design. First, one of Equation (1) and Equation (2) must be true.

$$BV\_x + \text{offset}X + nPbSw + xPbs - xCbs <= 0 \quad (1)$$

$$BV\_y + \text{offset}Y + nPbSh + yPbs - yCbs <= 0 \quad (2)$$

Second, the following Wavefront Parallel Processing (WPP) condition in Equation (3) must be true.

$$(xPbs + BV\_x + \text{offset}X + nPbSw - 1)/\text{CtbSize}Y - xCbs/\text{CtbSize}Y <= yCbs/\text{CtbSize}Y - (yPbs + BV\_y + \text{offset}Y + nPbSh - 1)/\text{CtbSize}Y \quad (3)$$

In equations (1) to (3), (BV_x, BV_y) represents a luma block vector for the current PU, nPbSw and nPbSh are the width and height of the current PU, (xPbS, yPbS) represents a location of a top-left pixel of the current PU relative to the current picture, (xCbs, yCbs) represents a location of a top-left pixel of a current CU relative to the current picture, and CtbSizeY is the size of a CTU. The two variables offsetX and offsetY are two adjusted offsets in two dimensions in consideration of chroma sample interpolation for the CPR mode, and are defined in Equation (4) and Equation (5).

$$\text{offset}X = BVC\_x \ \& \ 0x7?2:0 \quad (4)$$

$$\text{offset}Y = BVC\_y \ \& \ 0x7?2:0 \quad (5)$$

where (BVC_x, BVC_y) represents the chroma block vector, in ⅛-pel resolution in HEVC.

Third, the reference block for predicting the current PU coded in the CPR mode must be within the same tile boundary or slice boundary.

Affine motion compensation utilizes an affine model to describe two-dimensional block rotations, as well as two-dimensional deformations of squares or rectangles into parallelogram. This affine model is described in Equation (6).

$$x' = a0 + a1*x + a2*y$$

$$y' = b0 + b1*x + b2*y \quad (6)$$

There are six parameters a0, a1, a2, b0, b1, and b2 involved in this affine model. For each pixel (x,y) in the area of interest, a motion vector for this pixel is A'−A=(a0+(a1−1)*x+a2*y, b0+b1*x+(b2−1)*y). The motion vector for each pixel is location dependent. In this affine model, if motion vectors of three different locations are known, the above six parameters in Equation (6) can be solved, so it is equivalent to the six parameters are known. Each location with a known motion vector is referred to as a control point. This six-parameter affine model corresponds to three-control-point model.

In an implementation of affine motion compensation, an affine flag is signalled for each 2N×2N block partition coded in either Merge mode or Advance Motion Vector Prediction (AMVP) mode. If this flag is true for a current block, derivation of motion vectors for the current block follows the affine model; if this flag is false, derivation of motion vectors for the current block follows a traditional translation model. Motion Vectors (MVs) of the three control points are signalled when the affine AMVP mode is used. At each control point location, the MV is predictively coded. Motion Vector Differences (MVDs) of these control points are then coded and transmitted.

Figure 5:
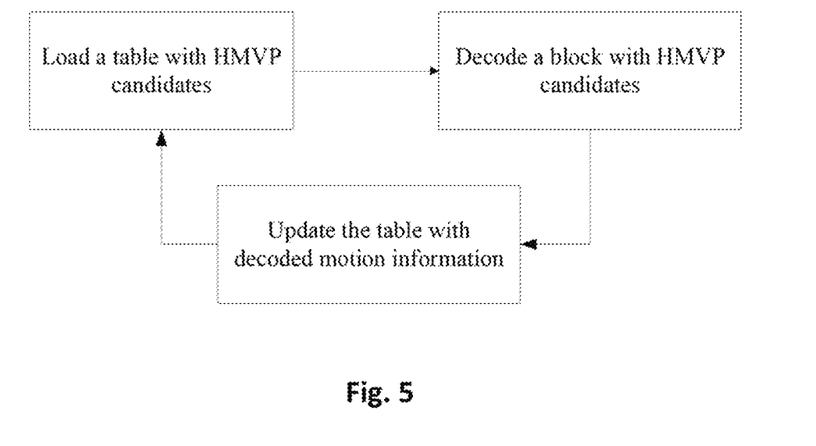
FIG. 5 illustrates a decoding flow of a History-based Motion Vector Prediction (HMVP) method.
Figure 6:
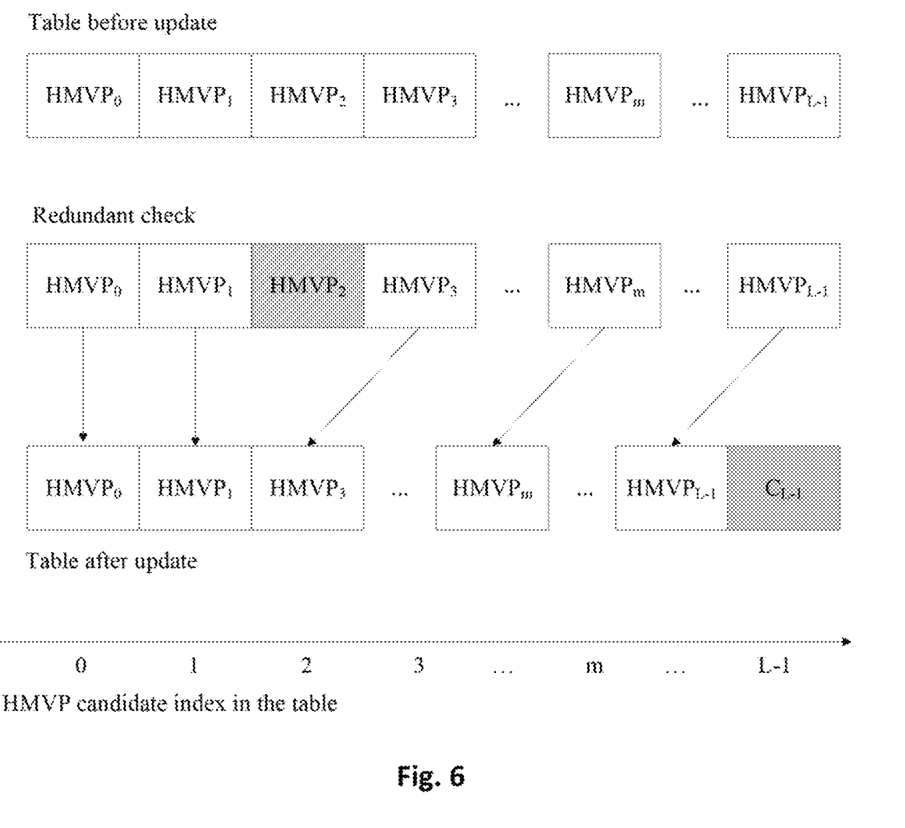
FIG. 6 illustrates an example of updating a table for the HMVP method.

A History-based Motion Vector Prediction (HMVP) method stores several entries of motion information of previously coded blocks in a table to be referenced by subsequent blocks. Each entry of motion information in the table is referred to as a HMVP candidate. The table with multiple HMVP candidates is maintained during the encoding or decoding process, and the table is emptied when a new slice is encountered. After encoding or decoding an inter-coded non-affine block, associated motion information is added to a last entry of the table as a new HMVP candidate. A decoding flow of the HMVP method is depicted in FIG. 5. For each block coded in inter prediction, a HMVP table with HMVP candidates is loaded by a decoder, and the decoder decodes the block with a candidate list including one or more HMVP candidates fetched from the HMVP table. The HMVP table is then updated with decoded motion information of the decoded block. FIG. 6 illustrates an example of updating a HMVP table for storing multiple HMVP candidates. In one example, the table size is set to be 6 (i.e. L=6), so up to 6 HMVP candidates may be added to the HMVP table. A constrained first in first out (FIFO) rule is applied when inserting a new HMVP candidate to the HMVP table. A redundant check is first applied to search whether there is a redundant HMVP candidate in the HMVP table which is identical to the newly added HMVP candidate. As shown in FIG. 6, $HMVP_2$ is determined as the redundant HMVP candidate, and $HMVP_2$ is removed from the HMVP table. After removing the redundant HMVP candidate from the HMVP table, all HMVP candidates located after the removed MVP candidate in the HMVP table are moved forward by reducing each of the indices by 1. The HMVP table will then be filled with a new HMVP candidate $C_{L-1}$.

HMVP candidates stored in the HMVP table may be used in the Merge candidate list construction process. The latest several HMVP candidates in the HMVP table are checked in order and are inserted to the Merge candidate list after inserting a Temporal Motion Vector Predictor (TMVP) candidate. Pruning is applied to the HMVP candidates by checking the HMVP candidates with spatial and temporal candidates in the Merge candidate list. Sub-block motion candidates such as Advanced Temporal Motion Vector Prediction (ATMVP) are not checked with the HMVP candidates. To reduce the number of pruning operations, three simplifications are introduced. In a first simplification, a number of HMPV candidates to be checked denoted by L is set according to Equation (7)

$$L = (N <= 4)?M:(8-N) \quad (7)$$

wherein N indicates a number of available non-sub-block Merge candidates and M indicates a number of available HMVP candidates in the HMVP table.

A second simplification checks whether a total number of available Merge candidates reaches a signaled maximally allowed Merge candidates minus 1, and the Merge candidate list construction process from the HMVP table is terminated if the total number of available Merge candidates reaches the signaled maximally allowed Merge candidates minus 1. A third simplification reduces a number of pairs for combined bi-predictive Merge candidate derivation from 12 to 6.

Similar to the Merge candidate construction process, HMVP candidates may be used in the AMVP candidate list construction process. Motion vectors of last K HMVP candidates in the HMVP table are inserted after the TMVP candidate in the AMVP candidate list. Only HMVP candidates with the same reference picture as an AMVP target reference picture are used to construct the AMVP candidate list. Pruning is applied to HMVP candidates. For example, K is set to 4 while the AMVP list size is set to 2, which is the same as the AMVP list size in the HEVC standard.

BRIEF SUMMARY OF THE INVENTION

Methods and apparatuses for processing video data with two separate History-based Motion Vector Predictor (HMVP) tables are disclosed. Embodiments of a video coding system implementing the methods comprise receiving input data associated with a current picture comprising a plurality of Virtual Pipeline Data Units (VPDUs), wherein each VDPU is a fixed size; performing a decoding process to decode Coding Units (CUs) in the current VPDU and generate decoded samples of the current VPDU, wherein each CU coded in a Current Picture Referencing (CPR) mode is decoded by fetching decoded samples in a reference block stored in a CPR referring buffer; and updating the CPR referring buffer by storing the decoded samples of the current VPDU when finishing the decoding process of the current VPDU, wherein the CPR referring buffer is updated one VPDU by one VPDU In some embodiments, the motion information of each HMVP candidate stored in the normal HMVP table are one or two Motion Vectors (MVs) and one or two reference frame indices, whereas the motion information of each HMVP candidate stored in the CPR HMVP table only include a MV as a reference frame index is inferred as the current picture for every HMVP candidate stored in the CPR HMVP table.

After encoding or decoding the current block by the normal inter prediction mode, the normal HMVP table is updated by motion information of the current block, or after encoding or decoding the current block by the CPR mode, the CPR HMVP table is updated by motion information of the current block.

In one embodiment, a MV of each HMVP candidate fetched from the normal HMVP table or the CPR HMVP table is rounded to an integer precision before adding into the candidate list for encoding or decoding the current block. In some embodiment of employing two HMVP tables for the normal inter prediction mode and the CPR mode, the two HMVP tables are shared by both luma and chroma components of video data when dual-tree block partitioning is used to split the luma and chroma components. The luma and chroma components of the video data are partitioned by different splitting structures when dual-tree block partitioning is employed, whereas the luma and chroma components are partitioned using the same splitting structure when share-tree block partitioning is employed. In one embodiment, when the current block is a luma block and dual-tree block partitioning is used to split luma and chroma components, the candidate list for the current block is reused by one or more collocated chroma blocks. In another embodiment, when the current block is a chroma block, the candidate list of the current block includes one or more CPR MVs from one or more collocated luma blocks.

In one embodiment of encoding or decoding the current block by the CPR mode, the method further checks a legality of a HMVP candidate fetched from the CPR HMVP table before adding into the candidate list. The legality of a HMVP candidate is determined by a reference block pointed by the HMVP candidate according to one embodiment, and the HMVP candidate is valid and is added to the candidate list if the reference block is within a range constraint. For example, all samples in the reference block are stored in a CPR referring buffer.

When the current block is encoded or decoded by the AMVP mode, only HMVP candidates with a same reference picture as an AMVP target reference picture are included in the candidate list. In some embodiments, a pruning process is applied to check the one or more HMVP candidates fetched from the normal HMVP table or the CPR HMVP table with one or more existing candidates to remove any redundant HMVP candidate from the candidate list.

In one embodiment, decoded samples of the reference block for predicting the current block are fetched from a CPR referring buffer when the current block is to be encoded or decoded by the CPR mode. The CPR referring buffer is updated one Virtual Pipeline Data Unit (VPDU) by one VPDU, where an area or a size of each VPDU is predefined, for example, the size of a VPDU is equal to a maximum Transform Block (TB) size.

Methods and apparatuses for decoding video data using a CPR referring buffer are also disclosed. Embodiments of a video decoding system implementing the methods receive input data associated with a current VPDU in a current picture, and perform a decoding process to decoding Coding Units (CUs) in the current VPDU and generate decoded samples of the current VPDU. Each CU coded in a CPR mode is decoded by fetching decoded samples in a reference block stored in the CPR referring buffer. The CPR referring buffer is updated by storing the decoded samples of the current VPDU when finishing the decoding process of the current VPDU. The CPR referring buffer is updated one VPDU by one VPDU. A size or an area of each VPDU is predefined, for example, the size of each VPDU is fixed to 64×64 luma samples or 32×32 chroma samples for 4:2:0 color sampling format. The size of each VPDU is set to equal to a maximum TB size according to one embodiment.

The decoding process for each CU includes decoding mode information, performing intra prediction, inter prediction, or CPR according to the mode information to generate a predictor for the CU, and recovering a transformed and quantized residual signal, and reconstructing the CU to generate the decoded samples based on the recovered transformed and quantized residual signal and the predictor. In some embodiments, one or more of decoded samples in a reference block stored in the CPR referring buffer for decoding a current CU coded in the CPR mode are not in a same Coding Tree Unit (CTU) as the current CU.

Aspects of the disclosure further provide an apparatus in a video coding system, and the apparatus comprises one or more electronic circuits configured for receiving input data associated with a current block in the current picture, constructing a candidate list for the current block by including one or more HMVP candidates, selecting one candidate from the candidate list for the current block, locating a reference block in a reference picture according to motion information of the selected candidate, and encoding or decoding the current block by predicting the current block using the reference block according to a normal inter prediction mode or CPR mode. The one or more HMVP candidates are fetched from a normal HMVP table if the current block is to be processed by a normal inter prediction mode, and the one or more HMVP candidates are fetched from a CPR HMVP table if the current block is to be processed by a CPR mode. The reference picture is the current picture if the current block is processed by the CPR mode.

Aspects of the disclosure further provide a non-transitory computer readable medium storing program instructions for causing a processing circuit of an apparatus to encode or decode video data of a current block by constructing a candidate list using a normal HMVP table or a CPR HMVP table according to a prediction mode of the current block. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

It will be readily understood that various modules of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Various embodiments of the present invention improve the integration of Current Picture Referencing (CPR) and other coding tools. Some embodiments consider the scenario of applying dual-tree block partitioning for splitting luma and chroma components with the integration of CPR and normal inter prediction. A flag CPR enable flag is signaled to indicate whether a current CU or a current PU is coded by the CPR mode. A current CU or PU is inferred to be coded with the CPR mode when a current picture is included in the reference picture list and the reference picture list does not have any inter reference picture. For example, if all reference pictures in the reference picture list are current pictures or if there is only one reference picture in the reference picture list and the only reference picture is the current picture, the current CU or PU is inferred to be coded with the CPR mode. In one example, a current picture is included in the reference picture list and there is no other normal inter reference picture in the reference picture list, when one or multiple collocated luma blocks are coded in the CPR mode, a current chroma CU or PU is inferred to be coded with the CPR mode. In the following descriptions, if a current block is coded with the CPR mode or if CPR is enabled for a current block, a reference picture pointing to the current picture is used for block prediction.

Implementing CPR with History-based Motion Vector Prediction The HMVP method improves the coding efficiency of video coding by including one or more HMVP candidates in Merge candidate list or AMVP candidate list. Blocks coded or to be coded in a normal inter prediction mode such as Skip mode, Merge mode, or AMVP mode may be predicted by a reference block derived from a HMVP candidate. In some example, the normal inter prediction mode is a prediction mode that uses a motion vector predictor with a normal reference picture, the motion vector predictor is selected from a candidate list and is used to generate the prediction pixel values of the current block, and an index of the selected motion vector predictor is transmitted by the encoder to the decoder so that the decoder is able to derive the selected motion vector predictor after constructing the candidate list by using the same way as the encoder does. The normal reference picture is a picture coded before the current picture that can be referenced by the current picture. In some embodiments, a HMVP table only stores motion information of CUs coded in a normal inter prediction mode, and the normal inter prediction mode includes one or a combination of Merge, Skip, and AMVP modes. In one embodiment, if the CPR mode is enabled for a current block in a current picture and the current picture is the only reference picture in the reference picture list, the HMVP method is disabled. In another embodiment, only MVs pointing to normal reference pictures are used to update the HMVP table, that is, CPR MVs cannot be inserted into the HMVP table.

In some embodiment of the present invention, the HMVP method is also used to process blocks coded or to be coded by the CPR mode. Two separate HMVP tables (or two separate HMVP lists) are therefore maintained, one HMVP table stores HMVP candidates corresponding to motion information of previously coded blocks processed by the normal inter prediction mode, which is referred to as a normal HMVP table, another HMVP table stores HMVP candidates corresponding to motion information of previously coded blocks processed by the CPR mode, which is referred to as a CPR HMVP table. Each HMVP candidate stored in the normal HMVP table includes one or two MVs pointing to one or two normal inter reference picture in List 0, List 1, or both List 0 and List 1. The normal HMVP table stores MVs and reference frame indices for the HMVP candidates. Each HMVP candidate stored in the CPR HMVP table includes a MV pointing to the current picture. Only the MV needs to be stored in the CPR HMVP table and a reference frame index is ignored as the reference picture is always the current picture for each HMVP candidate in the CPR HMVP table. In this embodiment, to encode or decode a current block coded in a normal inter prediction mode such as the AMVP, Merge or Skip mode, a candidate list is constructed by including one or more HMVP candidates fetched from the normal HMVP table. If the current block is encoded or decoded in the CPR mode, a candidate list is constructed by including one or more HMVP candidates fetched from the CPR HMVP table. For example, the one or more HMVP candidates are inserted after a Temporal Motion Vector Prediction (TMVP) candidate in the candidate list.

In cases when the current block is coded in the AMVP mode, only HMVP candidates with the same reference picture as an AMVP target reference picture are used to construct the candidate list. A pruning process may be applied to check the one or more HMVP candidates with one or more existing candidates in the candidate list to remove any redundant HMVP candidate from the candidate list. A candidate is selected from the candidate list for the current block, for example, an encoder selects a candidate by conducting a rate distortion optimization, and a decoder selects a candidate according to an index transmitted in the video bitstream. The current block is then encoded or decoded by locating a reference block in a reference picture according to motion information of the selected candidate and predicting the current block by the reference block. The reference picture is the current picture if the current block is coded in the CPR mode.

In some embodiments, one condition to check the legality of a CPR MV is performed before adding the CPR MV from the CPR HMVP table into a Merge candidate list or AMVP candidate list. A range constraint is set for determining the legality of each HMVP candidate fetched from the CPR HMVP table, and a HMVP candidate fetched from the CPR HMVP table is valid to be added into the candidate list if a reference block pointed by the HMVP candidate is within the range constraint. For example, a CPR MV is marked as valid after the legality check if reference samples in a reference block pointed by the CPR MV are decoded and stored in a CPR referring buffer. For example, the CPR referring buffer stores decoded samples of a current CTU and one left CTU region, and a valid CPR MV points to a reference block within the current CTU or one left CTU region. An invalid CPR MV is not added into the Merge candidate list or AMVP candidate list.

In one embodiment of employing two HMVP tables for the normal inter prediction mode and the CPR mode, and these two HMVP tables are shared by both luma and chroma components of video data when dual-tree block partitioning is used to split the luma and chroma components. The luma and chroma components are partitioned using different block splitting structures when dual-tree block partitioning is used while the luma and chroma components are partitioned using the same block splitting structure when share-tree block partitioning is used. In another embodiment, the candidate list for a current luma block is reused by one or more collocated chroma blocks when dual-tree block partitioning is used to split luma and chroma components. In another embodiment, the candidate list of a current chroma block includes one or more CPR MVs derived from one or more collocated luma blocks when the current chroma block is to be processed by the CPR mode.

In another embodiment, one HMVP table is used to store previously decoded motion information, both MVs from CPR and normal inter prediction modes can be used to update the HMVP table, and one or more HMVP candidates are fetched from the HMVP table to be inserted in the Merge candidate list or AMVP candidate list. In one embodiment, only CPR MVs in an AMVP candidate list can be used when the current picture is selected as the reference picture for predicting the current block.

In one embodiment, the encoder or decoder only inserts one or more CPR HMVPs into a Merge candidate list or AMVP candidate list from a HMVP table. In another embodiment, any HMVP candidate fetched from a HMVP table is rounded to an integer precision before adding into a Merge candidate list or AMVP candidate list. In one embodiment of employing dual-tree block partitioning for luma and chroma components, when the HMVP method and the CPR mode are used together, two HMVP tables are maintained and used during encoding or decoding, one HMVP table for the luma component and another HMVP table for the chroma components. In another embodiment, one single HMVP table is maintained and used for the luma and chroma components and motion information of both the luma and chroma components can update the HMVP table. In one example of sharing a single HMVP table for the luma and chroma components, the chroma components can only reuse a luma CPR MV without using any neighboring chroma CPR MV.

Implementing CPR with Inter Prediction The following embodiments describe various constraints applied when integrating the CPR mode with Skip mode coding, Merge mode coding, or AMVP mode coding. In one embodiment, the video encoder or decoder only adds CPR MVs into a Merge candidate list or AMVP candidate list from spatial candidates or temporal candidates. In one embodiment, when a current picture is selected as the reference picture for encoding or decoding a current block coded in the AMVP mode, only CPR MVs in the AMVP candidate list can be used. In another embodiment, all MVs from the CPR or normal inter prediction mode in the Merge candidate list can be used. In another embodiment, only MVs from the normal inter prediction mode in the Merge candidate list can be used. In another embodiment, a MV is rounded to an integer precision before adding into the Merge candidate list or AMVP candidate list from a spatial candidate, temporal candidate, or generated candidate.

In one embodiment of employing dual-tree block partitioning to split luma and chroma components, the luma and chroma components share a same Merge candidate list or AMVP candidate list. For example, a luma block generates a Merge candidate list or AMVP candidate list, and a collocated chroma block reuses this Merge candidate list or AMVP candidate list. In another embodiment, one or more CPR MVs from one or more collocated luma blocks can be used in construction of a Merge candidate list or AMVP candidate list for a current chroma block. In some embodiments of considering inserting one or more CPR MVs pointing to the current picture in a Merge candidate list or AMVP candidate list, one condition to check the legality of each CPR MV is performed first before adding the CPR MV into the Merge candidate list or AMVP candidate list.

Implementing CPR with Pairwise Average Candidates or Non-sub-block STMVP Candidates Pairwise average candidates are generated from predefined pairs of Merge candidates in a Merge candidate list as a replacement of combined candidates in the HEVC standard. List 0 MVs of Merge candidates in each predefined pair are averaged to generate a List 0 MV for a pairwise average candidate if both the List 0 MVs are available, and the List 0 MV of the Merge candidate with a larger Merge index is scaled to the reference picture of the Merge candidate with a smaller Merge index. The List 0 MV of one Merge candidate is used directly as the List 0 MV of the pairwise average candidate if only one List 0 MV is available. If no MV is available in List 0, List 0 of the pairwise average candidate is invalid. A similarly MV averaging rule is applied to derive List 1 MV of the pairwise average candidate. A non-sub-block Spatial-Temporal Motion Vector Prediction (STMVP) mode is a simplified version of the STMVP mode in JEM, which produces more coding gain by courtesy of its optimized reference position. A non-sub-block STMVP candidate is generated from averaging a combination of spatial and temporal candidates. The non-sub-block STMVP mode is also beneficial for hardware implementation. Inserting pairwise average candidates or non-sub-block STMVP candidates into a Merge candidate list or AMVP candidate list improve the coding efficiency in Skip mode coding, Merge mode coding, or AMVP mode coding.

In one embodiment, if all source candidates for generating a pairwise average candidate or non-sub-block STMVP candidate are CPR MVPs, the resulting pairwise average candidate or non-sub-block STMVP candidate is a valid CPR candidate. For example, two motion candidates from a Merge candidate list are both CPR candidates, and a pairwise average candidate generated from these two CPR candidates is also a valid CPR candidate. In one example, a MV of the pairwise average candidate is rounded to an integer MV. In another example, if a MV of the pairwise average candidate is not an integer MV, this pairwise average candidate is not added into the candidate list. In one embodiment, a CPR pairwise average candidate is not added into the candidate list. For example, if a reference picture of a CPR pairwise average candidate points to a current picture, it is not added into the candidate list.

In another embodiment, if all available candidates for generating a non-sub-block STMVP candidate are CPR candidates, the non-sub-block STMVP candidate is also a valid candidate. In another embodiment, only CPR candidates are treated as valid candidates for averaging. In one example, a MV of a non-sub-block STMVP candidate is rounded to an integer MV. In another example, if a MV of a non-sub-block STMVP candidate is not an integer MV, it is not added into the candidate list. In another embodiment, CPR candidates are treated as invalid candidates for generating a non-sub-block STMVP candidate. For example, if a reference picture of a non-sub-block STMVP candidate points to a current picture, it is not added into the candidate list.

Implementing CPR with MMVD Merge mode with Motion Vector Difference (MMVD) is considered in Skip mode coding or Merge mode coding in recent video coding design. Syntax elements corresponding to MMVD are signaled if a Merge flag or Skip flag is enabled. The concept of MMVD is to extend existed MVs to increase the diversity of these MVs in a Merge candidate list. First, K MVs in a Merge candidate list are selected as MMVD's expansion, where K is an integer larger than zero. Only Merge candidates with a default Merge type (MRG_TY-PE_DEFAULT_N) can be selected for MMVD expansion. Similar to a normal Merge coding process, only a Merge candidate index is needed to be signaled, and a decoder can construct MV information from the Merge candidate index and MMVD information, for example, the decoder determines interDir, reference index, and MVP index by referring to neighboring MV information according to the Merge candidate index. From the MMVD information, the decoder determines the number of base MV, extended direction, and extended step size. In one embodiment of implementing CPR with MMVD, only Merge candidates with IBC Merge type (e.g. MRG_TYPE_IBC) are conserved as valid MMVD's expansion when both CPR and MMVD are enabled. In this way, all extended MVs must point to the current picture. In another embodiment, the range of extended MVs can be constrained in a CTU, a CTU row, or M CTU rows, where M is an integer larger than zero. In one example, the MVD scaling in MMVD is disabled when the target candidate is a CPR candidate. In another embodiment, when CPR is enabled, MMVD is inferred to be disabled. In another embodiment, CPR candidates cannot be selected as MMVD's expansion.

In one embodiment of employing dual-tree block partitioning, when both MMVD and CPR are enabled, chroma components can reuse MMVD information from a luma component with or without scaling. In another embodiment of employing dual-tree block partitioning, when both MMVD and CPR are enabled, chroma components can derive MMVD information by using a Merge candidate list of the chroma components. In this way Merge candidates for luma and chroma components are generated independently. In another embodiment of employing dual-tree block partitioning, when MMVD and CPR are applied together, chroma components can reuse MMVD expansions of a luma component to derive expended MVs and select a best expanded MV as the resulting MV of the chroma components. This resulting MV can be different to the MV of the luma component. In this way, only one Merge candidate is generated for both the luma and chroma components, and this is compatible to the current design for Merge mode coding.

Implementing CPR with Affine Motion Compensation Affine Motion Compensation includes affine Merge mode and affine AMVP mode. Several methods are described in the following for improving the integration of CPR and affine motion compensation. In one embodiment, if CPR is enabled, affine modes including affine Merge and affine AMVP modes are disabled. In one embodiment, when a current picture is selected as the reference frame for coding a current block, the affine AMVP mode is disabled, so a flag used to indicate whether the affine AMVP mode is enabled can be saved. In another embodiment, one or more CPR MVs cannot be used in the affine Merge mode. In another embodiment, a reference picture cannot select a current picture when an affine mode is selected. In another embodiment, when an affine mode is selected, a codeword of selecting a current picture reference picture is removed from the reference picture index signaling.

In another embodiment, two or three control points for the affine AMVP mode need to be constrained and only MVs in a current picture can be used in the affine AMVP mode. In one embodiment, only a two-control-points affine model can be used when a current picture is selected as the reference picture. In another embodiment, only a three-control-points affine model can be used when a current picture is selected as the reference picture. In an embodiment, the three control points required in the affine Merge mode can be either corner derived MVs or spatial inherited MVs. If CPR is enabled with the affine Merge mode, the MVs of the three control points for both luma and chroma components should point to the current picture. For example, the first three corner-derived MVs pointing to the current picture are used for the affine Merge mode when CPR is enabled. In another example, inherited MVs pointing to the current picture are used for the affine Merge mode when CPR is enabled. In another example, if less than three corner-derived MVs come from the current picture are available for the affine Merge mode when CPR is enabled, spatial inherited MVs come from the current picture are used for the affine Merge mode. In one example, first N spatial inherited MVs come from the current picture and first M corner derived MV come from the current picture can be used as control points in the affine Merge mode. The values of N and M are both integer larger than zero. In another embodiment, when a current picture is selected as the reference picture, an integer MV flag for List 0 is inferred as true, or imv_idx is 1 or 2. In another embodiment, allow fractional MVs in the affine mode when a current picture is selected as the reference picture, an integer MV flag for List 0, List 1, or both List 0 and List 1 is signaled to indicate whether MVs are coded as integers. In another embodiment, MVs of each sub-block coded in affine mode are rounded to integer MVs.

In some other embodiments, the affine Merge mode or sub-block Merge mode such as the affine mode and Advanced Temporal Motion Vector Prediction (ATMVP) mode, can be signaled by using a separate candidate list and separate syntaxes. When CPR is enabled and in I-slice or when CPR is enabled and all the reference pictures are current pictures or there is only one reference picture which is the current picture, the affine Merge mode or sub-block Merge mode is disabled or forced to be not selected.

In another embodiment of applying dual-tree block partitioning, affine motion compensation and CPR are enabled at the same time, CU structures for luma and chroma components can be different. Affine AMVP coding for the luma and chroma components can be applied independently. In another embodiment, two Merge candidate lists are generated for luma and chroma components independently, so the luma and chroma components can apply the affine Merge mode independently. In another embodiment, chroma components can reuse control points of the luma component with scaling for affine Merge mode coding.

Implementing CPR with Sub-block ATMVP In one embodiment of implementing CPR with the sub-block ATMVP mode, if CPR is enabled, ATMVP is disabled. In another embodiment of applying dual-tree block partitioning, ATMVP and CPR are both enabled, an initial MV for chroma components for ATMVP can reuse an initial MV of a luma component when the MV of the luma component points to the current picture. In a case when there is no luma MV pointing to the current picture, chroma ATMVP will be disabled. In one embodiment, CPR MVs from a luma collocated block are treated as the ATMVP candidate for a current chroma block. In one embodiment, a collocated picture for the ATMVP mode cannot be the current picture. When signaling a collocated picture for the ATMVP mode or for a temporal collocated picture, the current picture is removed from the candidate collocated picture list, the current picture cannot be signaled, or the current picture is forced not to be signaled. In one embodiment, when a to-be-processed MV is pointed to the current picture, one condition to check the legality of the MV is performed first before adding the to-be-processed candidate into the candidate list. For example, a CPR MV is marked as valid after the legality check if all reference samples in a reference block pointed by the CPR MV are decoded and stored in a CPR referring buffer. For example, the CPR referring buffer stores decoded samples of a current CTU and one left CTU region, and a valid CPR MV points to a reference block within the current CTU or one left CTU region. An invalid CPR MV will not be added into the Merge candidate list or AMVP candidate list.

Updating Rule for CPR Referring Buffer A Virtual Pipeline Data Unit (VPDU) is defined as a basic unit for pipeline processing, it is a hardware-friendly design by dividing a video picture into fixed size VPDUs during video encoding or decoding. Each video picture is divided into multiple non-overlapping VPDUs for pipeline processing, and successive VPDUs may be processed by multiple pipeline stages at the same time. The concept of defining VPDUs is to constrain the buffer size in one pipeline architecture which decodes different CUs in different pipeline stages in parallel. A VPDU is either a square unit, for example, each VPDU contains M×M luma pixels or N×N chroma pixels, or a VPDU is a non-square unit. The dimension of a VPDU may be defined by an area, such as 4096 pixels, or a size, such as 64×64. In hardware decoders, each VPDU is processed by one pipeline stage after another pipeline stage until each VPDU is processed by all the pipeline stages of video decoding. The size or area of the VPDU is predefined. Different pipeline stages in the hardware decoder process different VDPUs simultaneously. Restricting a VPDU size to be within a size limit is a critical design issue in hardware implementation as the VPDU size is roughly proportional to the buffer size in most of the pipeline stages. An embodiment of the VPDU size is set to equal to a maximum Transform Block (TB) size, which is 32×32 luma pixels or 16×16 chroma pixels for 4:2:0 color format in the HEVC standard, or 64×64 luma pixels or 32×32 chroma pixels for 4:2:0 color format in a next-generating video standard.

In a current design of coding a current CU in a current Coding Tree Unit (CTU) by the CPR mode, when a current picture is selected as the reference picture, only samples in the current CTU can be referred by the current CU. In this way, when process a first CU in a current CTU, no available valid reference samples can be used in the CPR mode. One CPR referring buffer with a size equal to the CTU size is required to store decoded samples in the current CTU. This CPR referring buffer is reset after decoding one CTU, and it is updated after each CU is decoded. The CPR referring buffer is updated one CU by one CU. Only the decoded samples stored in the CPR referring buffer can be used in the CPR mode.

In some embodiments of the present invention, decoded samples stored in a CPR referring buffer are updated when finishing the decoding process of one VPDU, that is the CPR referring buffer is updated one VPDU by one VPDU. The VPDU can be a CU with 64×64 luma samples or the VPDU can be set to have the same size as a maximum transform size block. The CPR referring buffer is a first-in-first-out (FIFO) buffer. In one embodiment, decoded samples stored in the CPR referring buffer can be used for decoding a current CU coded in the CPR mode, regardless the decoded samples are in the same CTU as the current CU or not. For example, one or more decoded samples in a reference block stored in the CPR referring buffer used for predicting a current CU are not in a same CTU as the current CU. In an exemplary embodiment, a CPR referring buffer is updated when finishing the decoding process of one VPDU, and decoded samples stored in the CPR referring buffer can be used in decoding a current CU by the CPR mode, no matter that the decoded samples are in the same CTU as the current CU or not.

Figure 7:
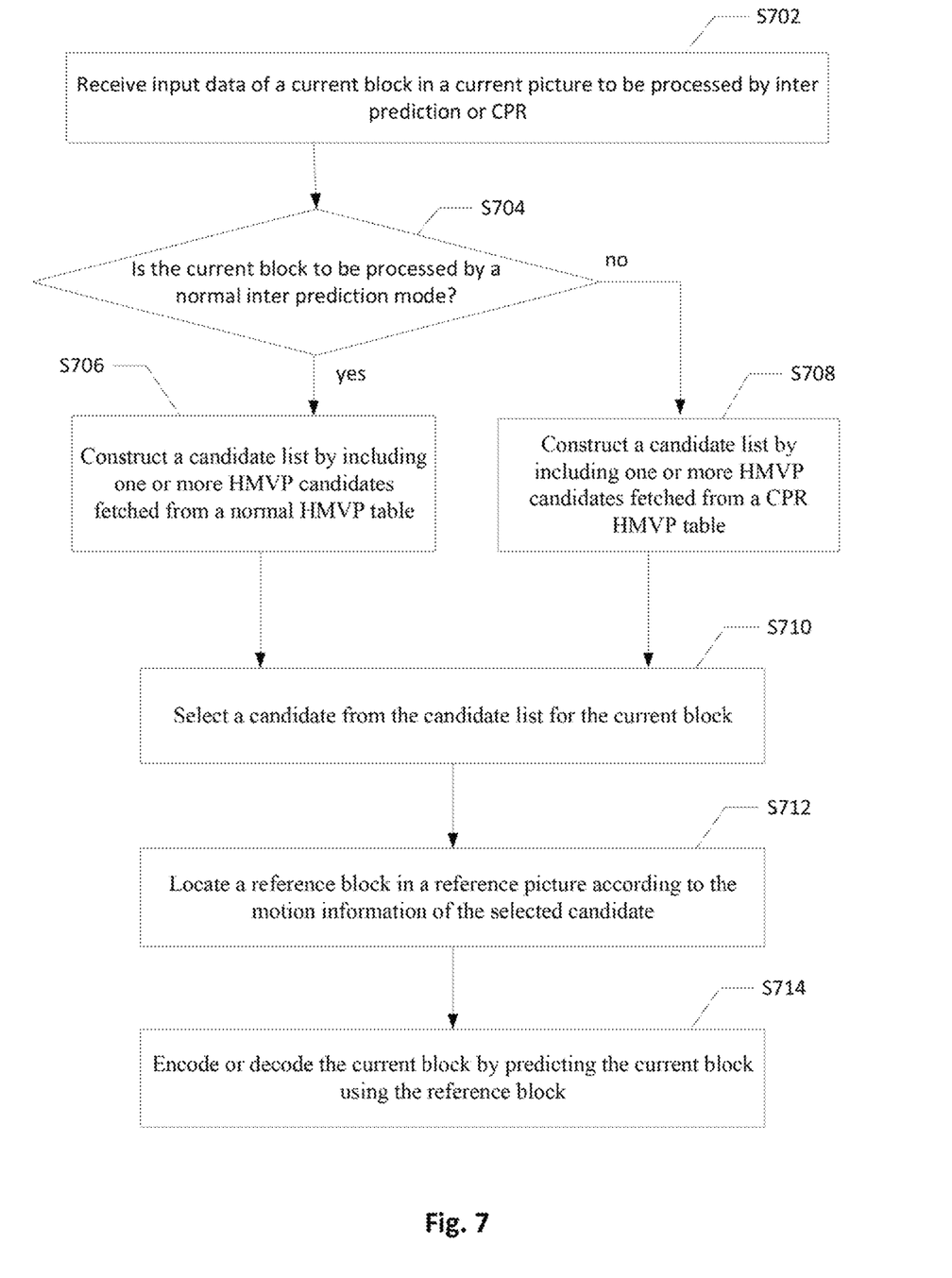
FIG. 7 is a flowchart illustrating a video processing method for encoding or decoding a current block using two HMVP tables according to an exemplary embodiment of the present invention.

Representative Flowcharts for Embodiments FIG. 7 is a flowchart illustrating a video processing method for processing a current block according to an embodiment of employing Current Picture Referencing (CPR) with the History-base Motion Vector Prediction (HMVP) method. The video processing method illustrated in FIG. 7 may be implemented in a video encoder or video decoder. The video encoder or video decoder receives input data of a current block in a current picture in step S702, and the current block is encoded or to be encoded by inter prediction or CPR. A reference picture for the current block encoded or to be encoded by CPR is the current picture. Step 704 checks whether the current block is processed by a normal inter prediction mode or a CPR mode, if the current block is processed by a normal inter prediction mode such as the Skip, Merge, or AMVP mode, a candidate list for the current block is constructed by including one or more HMVP candidates fetched from a normal HMVP table in step S706. If the current block is processed by a CPR mode, a candidate list for the current block is constructed by including one or more HMVP candidates fetched from a CPR HMVP table in step S708. The normal HMVP table and the CPR HMVP table are separately maintained, the normal HMVP table is updated by motion information of blocks coded by the normal inter prediction modes, and the CPR HMVP table is updated by motion information of blocks coded by the CPR modes. A candidate is selected from the candidate list for the current block in step S710, for example, the video encoder selects the candidate for the current block according to a Rate Distortion Optimization (RDO) decision or the video decoder selects the candidate for the current block according to an index parsed and decoded by an entropy decoder. A reference block in a reference picture is located according to motion information of the selected candidate in step S712. The reference picture is the current picture if the current block is processed by the CPR mode. In step S714, the current block is encoded or decoded by predicting the current block using the reference block.

Figure 8:
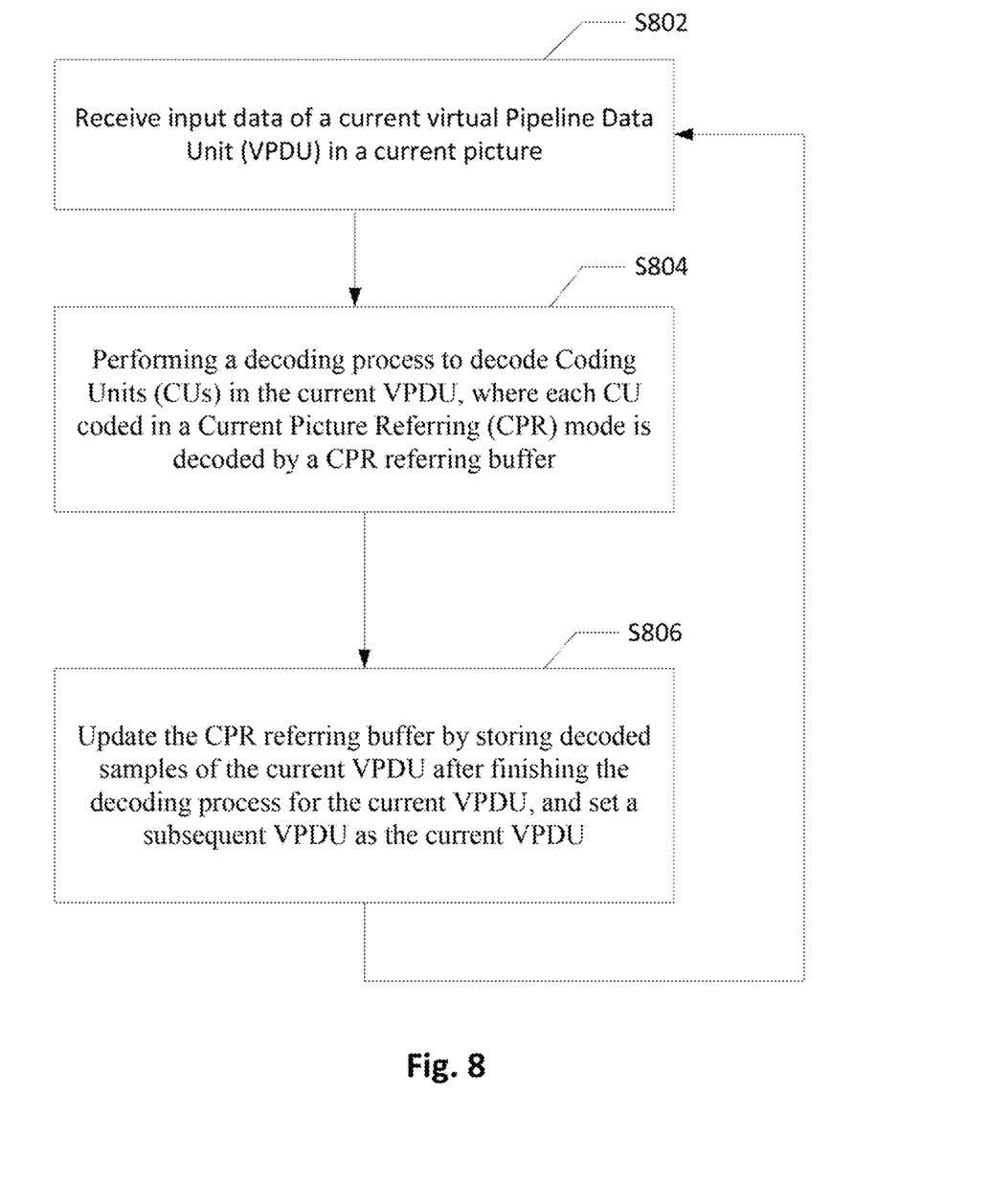
FIG. 8 is a flowchart illustrating a video processing method for decoding a current VPDU and updating a CPR referring buffer according to another exemplary embodiment of the present invention.

FIG. 8 is a flowchart illustrating a video processing method for processing a current block according to an embodiment of employing CPR. The video processing method illustrated in FIG. 8 may be implemented in a video decoder. The video decoder receives input data of a current Virtual Pipeline Data Unit (VPDU) in a current picture in step S802, and CPR is enabled in the current picture. A VPDU is defined by a maximum TB size or a predefined size or area. In step S804, a decoding process is performed to decode CUs in the current VPDU, and a CPR referring buffer is used to decode each CU coded in a CPR mode. In step S806, the CPR referring buffer is updated by storing decoded samples of the current VPDU, and a subsequent VPDU is set as the current VPDU. The current VPDU is then processed from step S802 to S086. The CPR referring buffer is updated one VPDU by one VPDU according to this embodiment.

Figure 9:
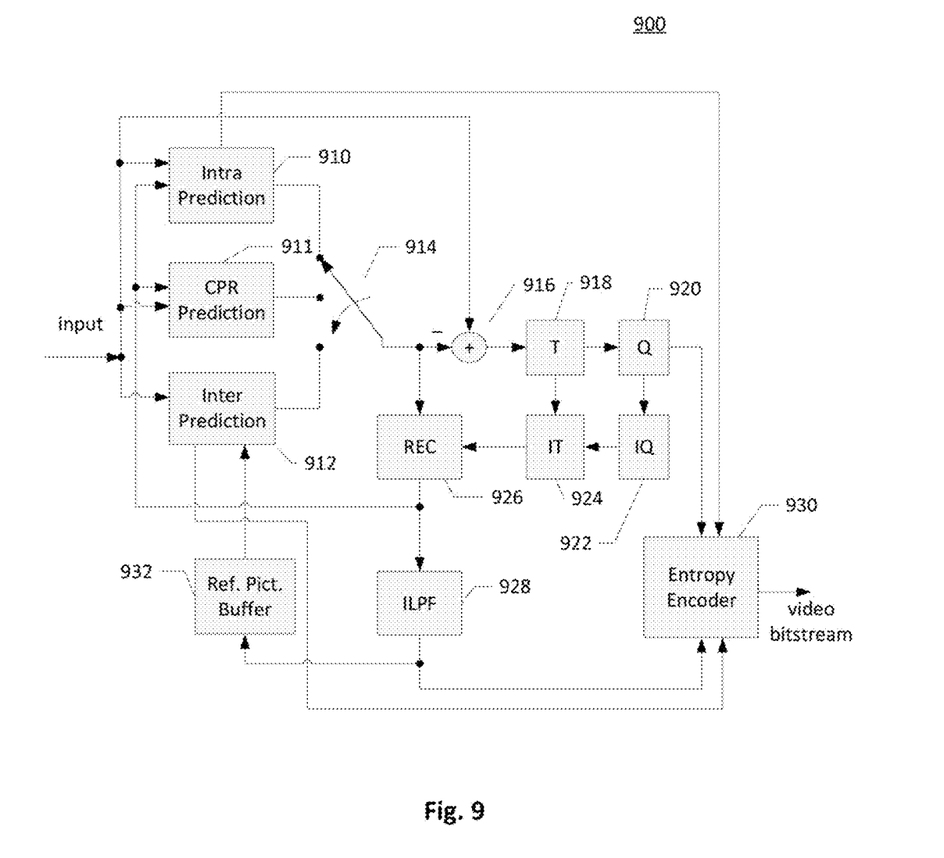
FIG. 9 illustrates an exemplary system block diagram for a video encoding system incorporating the video processing method according to embodiments of the present invention.

Representative Block Diagrams Any of the foregoing described video processing methods can be implemented in encoders, decoders, or both the encoders and decoders, for example, any of the video processing methods is implemented in a CPR prediction module or inter prediction module of an encoder or decoder. Alternatively, any of the video processing methods can be implemented as a circuit coupled to the CPR prediction module or inter prediction module of the encoder or decoder, so as to provide information needed by the CPR prediction module or inter prediction module. FIG. 9 illustrates an exemplary system block diagram for a Video Encoder 900 implementing one or more of the video processing methods of the present invention. The Video Encoder 900 receives input data of a current block in a current picture. In cases when the current block is to be processed by intra prediction, Intra Prediction module 910 provides an intra predictor for the current block based on reconstructed samples of the current picture according to an intra prediction mode. In cases when the current block is to be processed by CPR, CPR Prediction module 911 provides a CPR predictor based on a CPR MV of the current block. In some embodiments, the CPR MV of the current block is derived from a candidate selected from a candidate list of the current block, and the candidate list includes one or more HMVP candidates fetched from a CPR HMVP table. CPR Prediction module 911 obtains reconstructed samples stored in a CPR referring buffer to generate the CPR predictor, and the CPR referring buffer is updated one VPDU by one VPDU according to an embodiment of the present invention. In cases when the current block is processed by inter prediction, Inter Prediction module 912 performs motion estimation (ME) and motion compensation (MC) to provide an inter predictor based on video data from other picture or pictures according to one or two MVs of the current block. In some embodiments of the present invention, the one or two MVs are derived from a candidate selected from a candidate list of the current block, and the candidate list includes one or more HMVP candidates fetched from a normal HMVP table. The CPR HMVP table and the normal HMVP table are separately maintained and separately updated. One of Intra Prediction module 910, CPR Prediction module 911, and Inter Prediction module 912 supplies the selected predictor to Adder module 916 to form prediction errors, also called prediction residues.

The prediction residues of the current block are further processed by Transformation module (T) 918 followed by Quantization module (Q) 920. The transformed and quantized residual signal is then encoded by Entropy Encoder 934 to form an encoded video bitstream. The encoded video bitstream is then packed with side information. The transformed and quantized residual signal of the current block is processed by Inverse Quantization module (IQ) 922 and Inverse Transformation module (IT) 924 to recover the prediction residues. As shown in FIG. 9, the prediction residues are recovered by adding back to the selected predictor at Reconstruction module (REC) 926 to produce reconstructed samples. The reconstructed samples may be stored in Reference Picture Buffer (Ref. Pict. Buffer) 932 and used for prediction of other pictures. The reconstructed samples from REC 926 may be subject to various impairments due to the encoding processing, consequently, in-loop processing Deblocking Filter (DF) 928 and Sample Adaptive Offset (SAO) 930 are applied to the reconstructed samples before storing in the Reference Picture Buffer 932 to further enhance picture quality. Syntax associated with information for the in-loop processing DF 928 and SAO 930 are provided to Entropy Encoder 934 for incorporation into the encoded video bitstream.

Figure 10:
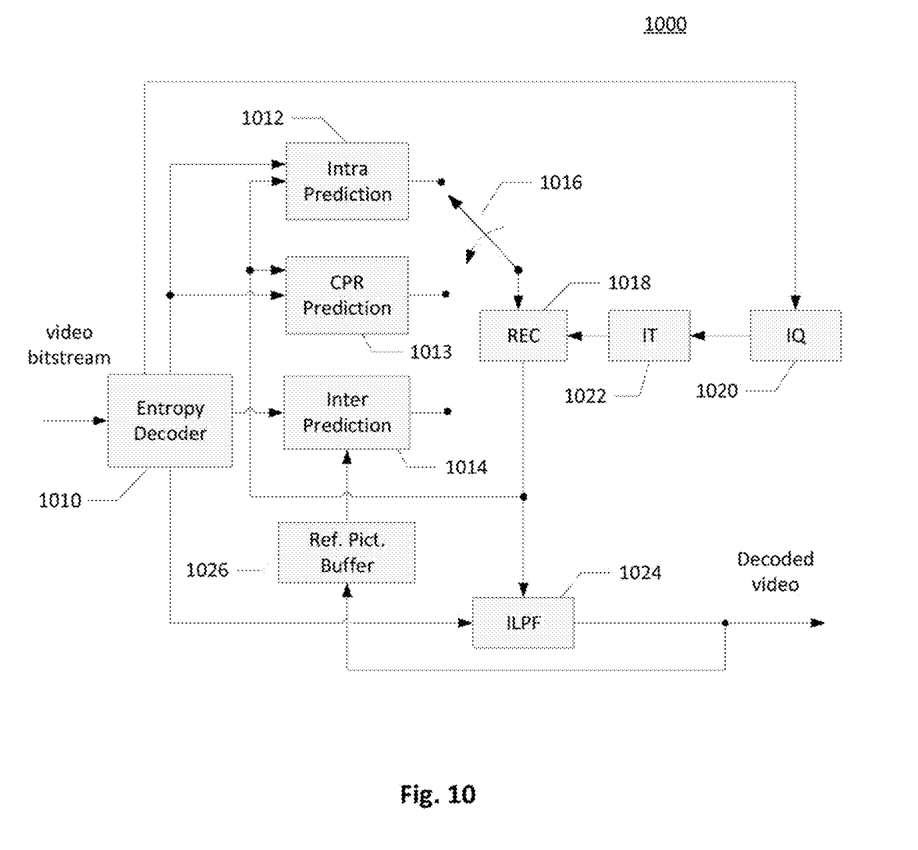
FIG. 10 illustrates an exemplary system block diagram for a video decoding system incorporating the video processing method according to embodiments of the present invention.

A corresponding Video Decoder 1000 for decoding the video bitstream generated by Video Encoder 900 of FIG. 9 is shown in FIG. 10. The encoded video bitstream is the input to Video Decoder 1000 and is decoded by Entropy Decoder 1010 to parse and recover the transformed and quantized residual signal and other system information. The decoding process of Decoder 1000 is similar to the reconstruction loop at Encoder 900, except Decoder 1000 only requires motion compensation prediction in Inter Prediction module 1014. In some embodiments of the present invention, two HMVP tables are separately maintained for decoding CUs coded in normal inter prediction modes and CUs coded in a CPR mode. For example, the current block is decoded by Intra Prediction module 1012, CPR Prediction module 1013, or Inter Prediction module 1014, and if the current block is coded in a normal inter prediction mode, a normal HMVP table is used to construct a candidate list for the current block. If the current block is coded in the CPR mode, a CPR HMVP table is used to construct a candidate list for the current block. Switch module 1016 selects an intra predictor from Intra Prediction module 1012, a CPR predictor from CPR Prediction module 1013, or an Inter predictor from Inter Prediction module 1014 according to decoded mode information. The transformed and quantized residual signal associated with each block is recovered by Inverse Quantization module (IQ) 1020 and Inverse Transformation module (IT) 1022. The recovered transformed and quantized residual signal is reconstructed by adding back the predictor in REC module 1018 to produce reconstructed samples. The reconstructed samples are further processed by DF 1024 and SAO 1026 to generate final decoded video. If the currently decoded picture is a reference picture, the reconstructed samples of the currently decoded picture are also stored in Ref. Pict. Buffer 1028 for later pictures in decoding order.

Various components of Video Encoder 900 and Video Decoder 1000 in FIG. 8 and FIG. 10 may be implemented by hardware components, one or more processors configured to execute program instructions stored in a memory, or a combination of the hardware and processor. For example, a processor executes program instructions to control receiving of input data associated with a current block in a current picture. The processor is equipped with a single or multiple processing cores. In some examples, the processor executes program instructions to perform functions in some components in Encoder 900 and Decoder 1000, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 9 and 10, Encoder 900 and Decoder 1000 may be implemented in the same electronic device, so various functional components of Encoder 900 and Decoder 1000 may be shared or reused if implemented in the same electronic device. For example, one or more of Reconstruction module 926, Inverse Transformation module 924, Inverse Quantization module 922, Deblocking Filter 928, Sample Adaptive Offset 930, and Reference Picture Buffer 932 in FIG. 9 may also be used to function as Reconstruction module 1018, Inverse Transformation module 1022, Inverse Quantization module 1020, Deblocking Filter 1024, Sample Adaptive Offset 1026, and Reference Picture Buffer 1028 in FIG. 10.

Embodiments of the processing method for a video coding system may be implemented in a circuit integrated into a video compression chip or program code integrated into video compression software to perform the processing described above. For examples, candidate list construction for encoding or decoding blocks coded in a normal inter prediction mode or CPR mode may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data in a video decoding system, comprising:
   receiving input data associated with a current picture comprising a plurality of Virtual Pipeline Data Units (VPDUs), wherein each VDPU is a fixed size;
   performing a decoding process to decode Coding Units (CUs) in the current VPDU and generate decoded samples of the current VPDU, wherein each CU coded in a Current Picture Referencing (CPR) mode is decoded by fetching decoded samples in a reference block stored in a CPR referring buffer; and
   updating the CPR referring buffer by storing the decoded samples of the current VPDU when finishing the decoding process of the current VPDU, wherein the CPR referring buffer is updated one VPDU by one VPDU.

2. The method of claim 1, wherein the size of each VPDU is fixed to 64×64 luma samples or 32×32 chroma samples for 4:2:0 color sampling format.

3. The method of claim 1, wherein the size of each VPDU is set to equal to a maximum Transform Block (TB) size.

4. The method of claim 1, wherein the decoding process for each CU comprises decoding mode information, performing intra prediction, inter prediction, or CPR according to the mode information to generate a predictor for the CU, and recovering a transformed and quantized residual signal, and reconstructing the CU to generate the decoded samples based on the recovered transformed and quantized residual signal and the predictor.

5. The method of claim 1, wherein one or more of decoded samples in a reference block stored in the CPR referring buffer for decoding a current CU coded in the CPR mode are not in a same Coding Tree Unit (CTU) as the current CU.

* * * * *